United States Patent
Tremblay et al.

(10) Patent No.: US 10,890,463 B2
(45) Date of Patent: Jan. 12, 2021

(54) TAKEOFF PITCH GUIDANCE SYSTEM AND METHOD

(71) Applicant: C SERIES AIRCRAFT LIMITED PARTNERSHIP, Mirabel (CA)

(72) Inventors: Luc Tremblay, L'ile Bizard (CA); Marc-Antoine Delarche, Seattle, WA (US); Jean-François Chretien, Laval (CA)

(73) Assignee: AIRBUS CANADA LIMITED PARTNERSHIP, Mirabel (CA)

( * ) Notice: Subject to any disclaimer, the term of this patent is extended or adjusted under 35 U.S.C. 154(b) by 128 days.

(21) Appl. No.: 16/019,837

(22) Filed: Jun. 27, 2018

(65) Prior Publication Data
US 2019/0003853 A1 Jan. 3, 2019

Related U.S. Application Data

(60) Provisional application No. 62/525,876, filed on Jun. 28, 2017.

(51) Int. Cl.
| | |
|---|---|
| *G01C 23/00* | (2006.01) |
| *B64D 43/00* | (2006.01) |
| *G05D 1/08* | (2006.01) |
| *G08G 5/00* | (2006.01) |

(52) U.S. Cl.
CPC ......... *G01C 23/005* (2013.01); *B64D 43/00* (2013.01); *G05D 1/0808* (2013.01); *G05D 1/0816* (2013.01); *G08G 5/0021* (2013.01); *G08G 5/0065* (2013.01)

(58) Field of Classification Search
CPC .............................. B64D 43/00; G01C 23/005
USPC ............................................................ 701/4
See application file for complete search history.

(56) References Cited

U.S. PATENT DOCUMENTS

| | | | |
|---|---|---|---|
| 4,019,702 A | 4/1977 | Annin | |
| 4,383,299 A * | 5/1983 | Fischer | G05D 1/0061 244/17.13 |
| 4,764,872 A | 8/1988 | Miller | |
| 4,967,363 A | 10/1990 | Bonafe | |
| 4,980,835 A * | 12/1990 | Lawrence | B64C 27/325 244/17.11 |
| 5,136,518 A | 8/1992 | Glover | |

(Continued)

FOREIGN PATENT DOCUMENTS

| | | | | |
|---|---|---|---|---|
| EP | 1727012 A1 * | 11/2006 | ........... | G05D 1/0808 |
| WO | 2011078847 A1 | 6/2011 | | |

*Primary Examiner* — Jean Paul Cass
(74) *Attorney, Agent, or Firm* — Norton Rose Fulbright Canada LLP

(57) ABSTRACT

The present disclosure provides methods and system for providing takeoff pitch guidance for an aircraft. Takeoff pitch guidance for the aircraft is provided in a pitch target mode at a time of takeoff. The pitch target mode corresponds to determining pitch as a function of a target pitch based on aircraft operating parameters. A transition event is detected while in the pitch target mode. The takeoff pitch guidance for the aircraft is transitioned from the pitch target mode to an airspeed error mode after the transition event is detected and the takeoff pitch guidance is provided in the airspeed error mode. The airspeed error mode corresponds to determining pitch based on a difference between an actual speed and a target speed of the aircraft.

18 Claims, 7 Drawing Sheets

(56) References Cited

U.S. PATENT DOCUMENTS

| | | | | |
|---|---|---|---|---|
| 5,465,212 A * | 11/1995 | Fowler | F41G 5/18 | |
| | | | 244/177 | |
| 5,596,499 A * | 1/1997 | Glusman | G05D 1/0858 | |
| | | | 700/78 | |
| 6,317,660 B1 * | 11/2001 | Barker | B64G 1/365 | |
| | | | 701/13 | |
| 6,389,333 B1 * | 5/2002 | Hansman | G01C 23/00 | |
| | | | 701/14 | |
| 7,281,683 B2 | 10/2007 | Delaplace et al. | | |
| 7,342,515 B2 * | 3/2008 | He | G01C 23/005 | |
| | | | 340/974 | |
| 8,170,728 B2 * | 5/2012 | Roesch | B64C 27/22 | |
| | | | 701/3 | |
| 8,332,082 B2 * | 12/2012 | Christensen | G05D 1/0202 | |
| | | | 701/3 | |
| 8,421,649 B2 * | 4/2013 | Marstall | G01C 23/005 | |
| | | | 340/975 | |
| 8,436,283 B1 * | 5/2013 | Tournes | F41G 7/2293 | |
| | | | 244/3.15 | |
| 8,473,124 B2 * | 6/2013 | Shue | G05D 1/101 | |
| | | | 701/4 | |
| 8,594,862 B2 * | 11/2013 | Callou | B64C 39/024 | |
| | | | 701/2 | |
| 8,665,120 B2 * | 3/2014 | Thoreen | G01C 23/005 | |
| | | | 340/975 | |
| 8,774,986 B1 | 7/2014 | Theriault et al. | | |
| 8,793,040 B2 | 7/2014 | Guedes et al. | | |
| 8,948,936 B2 * | 2/2015 | Shue | B64C 19/00 | |
| | | | 701/4 | |
| 9,157,377 B2 * | 10/2015 | Lickfold | F02C 9/28 | |
| 2008/0161983 A1 | 7/2008 | Salesse-Lavergne | | |
| 2010/0045485 A1 * | 2/2010 | Dunsky | G08G 5/0082 | |
| | | | 340/945 | |
| 2010/0076625 A1 * | 3/2010 | Yoeli | B64C 13/044 | |
| | | | 701/4 | |
| 2012/0179308 A1 * | 7/2012 | Peters | G05D 1/0858 | |
| | | | 701/13 | |
| 2013/0060406 A1 * | 3/2013 | Christensen | G05D 1/0607 | |
| | | | 701/4 | |
| 2013/0090788 A1 * | 4/2013 | Christensen | G05D 1/044 | |
| | | | 701/4 | |
| 2015/0367937 A1 * | 12/2015 | Greenfield | G05D 1/0858 | |
| | | | 701/4 | |
| 2017/0008647 A1 * | 1/2017 | Pountney | B64F 5/60 | |
| 2017/0008648 A1 * | 1/2017 | Pountney | B64D 45/0005 | |
| 2017/0300067 A1 * | 10/2017 | Douglas | G05D 1/0011 | |
| 2017/0357618 A1 * | 12/2017 | Hamblin | G06Q 10/06 | |
| 2018/0061250 A1 * | 3/2018 | Moran | G01C 23/00 | |
| 2018/0222599 A1 * | 8/2018 | Papadopoulos | F15B 19/005 | |
| 2018/0275651 A1 * | 9/2018 | Prosser | G05D 1/0061 | |
| 2018/0305000 A1 * | 10/2018 | Schmidt | B64C 25/36 | |
| 2019/0003853 A1 * | 1/2019 | Tremblay | G01C 23/005 | |
| 2019/0004081 A1 * | 1/2019 | Tremblay | G05D 1/0072 | |
| 2019/0376576 A1 * | 12/2019 | Fazeli | B64F 5/60 | |

* cited by examiner

TAKEOFF PITCH GUIDANCE SYSTEM AND METHOD

CROSS-REFERENCE TO RELATED APPLICATION(S)

This application relies for priority on U.S. Provisional Patent Application Ser. No. 62/525,876 filed on Jun. 28, 2017, the entire content of which is incorporated herein by reference.

TECHNICAL FIELD

The present disclosure relates generally to aircraft guidance, and more specifically to takeoff pitch guidance.

BACKGROUND OF THE ART

During takeoff, an aircraft accelerates on a runway to a takeoff rotation speed. Once the takeoff rotation speed is reached, the pitch of the aircraft is increased to increase lift from the wings. The aircraft continues to accelerate to a takeoff liftoff speed and the aircraft lifts off the runway. After liftoff, the aircraft performs an initial climb-out by climbing to a climb-out altitude whereupon the takeoff phase of the flight is over and the aircraft begins climbing to its cruise altitude.

Typically, a guidance system provides takeoff pitch guidance by providing pitch information to a pilot who then controls the pitch of the aircraft. For example, the guidance system may provide pitch and/or display pitch markers on a flight display. These may be derived from input from various sensors associated with the aircraft.

Providing pitch guidance efficiently during takeoff is critical to the performance of the aircraft. For instance, the rotation of the aircraft affects the takeoff field length (i.e., a horizontal distance along a takeoff path from brake release until the aircraft has reached the defined screen height).

As such, there is room for improvement.

SUMMARY

The present disclosure provides methods and system for providing takeoff pitch guidance for an aircraft. Takeoff pitch guidance for the aircraft is provided on the primary flight display (PFD) during the takeoff phase. The pitch target mode corresponds to determining a target pitch as a function of aircraft operating parameters. A transition event is detected while in the pitch target mode. The takeoff pitch guidance for the aircraft is transitioned from the pitch target mode to an airspeed error mode after the transition event is detected and the takeoff pitch guidance is provided in the airspeed error mode The airspeed error mode corresponds to determining the target pitch based on a difference between an actual speed and a target speed of the aircraft.

In accordance with a broad aspect, there is provided a method for providing takeoff pitch guidance for an aircraft. The method comprises providing takeoff pitch guidance for the aircraft in a pitch target mode at a time of takeoff, the pitch target mode corresponding to determining a target pitch as a function of aircraft operating parameters, detecting a transition event while in the pitch target mode, transitioning the takeoff pitch guidance for the aircraft from the pitch target mode to an airspeed error mode after the transition event is detected, the airspeed error mode corresponding to determining the target pitch based on a difference between an actual speed and a target speed of the aircraft, and providing the takeoff pitch guidance in the airspeed error mode.

In some embodiments, the transition event corresponds to when a weight-off-wheels condition of the aircraft is met.

In some embodiments, transitioning the takeoff pitch guidance from the pitch target mode to the airspeed error mode comprises doing so after a time delay that starts when the weight-off-wheels condition is met.

In some embodiments, the method further comprises determining the time delay based on the aircraft operating parameters.

In some embodiments, determining the target pitch comprises setting the target pitch to an initial target pitch, monitoring a current pitch of the aircraft, and changing the initial target pitch as a function of the current pitch of the aircraft to reach a final target pitch.

In some embodiments, changing the initial target pitch comprises setting the target pitch to an intermediate target pitch, and changing the intermediate target pitch to the final target pitch.

In some embodiments, the intermediate target pitch is set as a function of a first rate of change of pitch over time, and the final target pitch is set as a function of a second rate of change of pitch over time.

In some embodiments, the intermediate target pitch corresponds to a value where a tail of the aircraft has cleared a ground striking point.

In some embodiments, changing the intermediate target pitch comprises setting the target pitch to the final target pitch when the transition event occurs.

In some embodiments, the airspeed error mode comprises determining the target pitch of the aircraft based on a takeoff airspeed control law.

In some embodiments, the method further comprises providing a minimum pitch limit and a maximum pitch limit when in the airspeed error mode.

In some embodiments, providing pitch guidance comprises displaying a pitch target marker on an aircraft display when in the pitch target mode and displaying a flight director on the aircraft display when in the airspeed error mode.

According to another broad aspect, there is provided a system for providing takeoff pitch guidance for an aircraft. The system comprises a processing unit and a non-transitory computer-readable memory having stored thereon program instructions. The program instructions are executable by the processing unit for providing takeoff pitch guidance for the aircraft in a pitch target mode at a time of takeoff, the pitch target mode corresponding to determining a target pitch as a function of aircraft operating parameters, detecting a transition event while in the pitch target mode, transitioning the takeoff pitch guidance for the aircraft from the pitch target mode to an airspeed error mode after the transition event is detected, the airspeed error mode corresponding to determining the target pitch based on a difference between an actual speed and a target speed of the aircraft, and providing the takeoff pitch guidance in the airspeed error mode.

In some embodiments, the transition event corresponds to when a weight-off-wheels condition of the aircraft is met.

In some embodiments, transitioning the takeoff pitch guidance from the pitch target mode to the airspeed error mode comprises doing so after a time delay that starts when the weight-off-wheels condition is met.

In some embodiments, the program instructions are further executable by the processing unit for determining the time delay based on the aircraft operating parameters.

In some embodiments, determining the target pitch comprises setting the target pitch to an initial target pitch, monitoring a current pitch of the aircraft, and changing the initial target pitch as a function of the current pitch of the aircraft to reach a final target pitch.

In some embodiments, changing the initial target pitch comprises setting the target pitch to an intermediate target pitch, and changing the intermediate target pitch to the final target pitch.

In some embodiments, the intermediate target pitch is set as a function of a first rate of change of pitch over time, and the final target pitch is set as a function of a second rate of change of pitch over time.

In some embodiments, the intermediate target pitch corresponds to a value where a tail of the aircraft has cleared a ground striking point.

In some embodiments, changing the intermediate target pitch comprises setting the target pitch to the final target pitch when the transition event occurs.

In some embodiments, the airspeed error mode comprises determining the target pitch of the aircraft based on a takeoff airspeed control law.

In some embodiments, the program instructions are further executable by the processing unit for providing a minimum pitch limit and a maximum pitch limit when in the airspeed error mode.

In some embodiments, providing pitch guidance comprises displaying a pitch target marker on an aircraft display when in the pitch target mode and displaying a flight director on the aircraft display when in the airspeed error mode.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
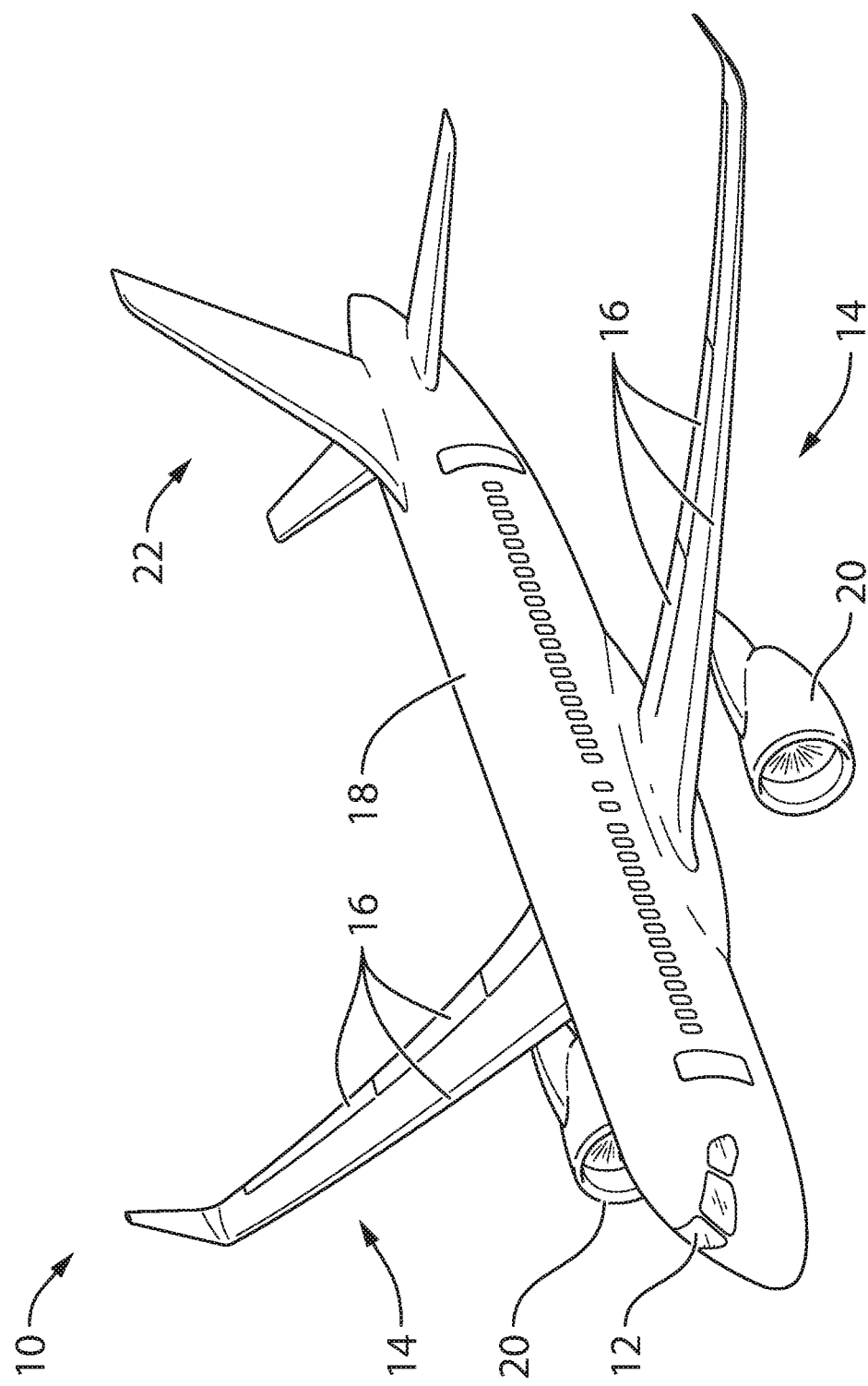
FIG. 1 is a diagram of an example aircraft.

With reference to FIG. 1, an exemplary aircraft 10 is shown. The aircraft 10 may be any type of aircraft such as a propeller plane, jet plane, turbojet plane, turbo-propeller plane, and the like. For example, the aircraft 10 may be a narrow-body, twin-engine jet airliner. The aircraft 10 may be a fixed-wing aircraft. The aircraft 10 may comprise flight control components 16, wings 14, fuselage 18, engines 20 and empennage 22 of known or other type. In the embodiment illustrated, a respective single engine 20 is mounted under each of the wings 14. However, one or more of engines 20 may be mounted to one or more of wings 14. Alternatively, or in addition, one or more of engines 20 may be mounted to fuselage 18 or be installed on the aircraft 10 in any suitable manner.

A cockpit 12 may be positioned at any suitable location on the aircraft 10, for example at a front portion of the fuselage 18. The cockpit 12 is configured for accommodating one or more pilots who may control the operation of the aircraft 10 by way of one or more operator controls. The operator controls may include any suitable number of pedals, yokes, steering wheels, centre sticks, flight sticks, levers, knobs, switches, and the like. The operator controls may be used to adjust the pitch of the aircraft 10 to a specific pitch angle. The pitch of the aircraft 10 refers to the rotation of the aircraft 10 around the aircraft's lateral or transverse axis. The pitch angle of the aircraft 10 refers to the angle between the horizontal axis and the longitudinal axis of the aircraft 10.

The flight control components 16 can be positioned at any suitable location on the aircraft, and may include any suitable number of ailerons, airbrakes, elevators, flaps, slats, flaperons, rudders, spoilers, spoilerons, stabilizers, trim tabs, and the like. In some embodiments of the aircraft 10, each wing 14 is equipped with at least one flap and/or at least one slat. Slats refer to the leading edge control components 16 of the wings 14. Flaps refer to the trailing edge control components 16 of the wings 14. The aircraft 10 can also be equipped with any number of additional suitable flight control components 18. In some further embodiments, the flight control components 16 include one or more thrust vectoring elements. The flight control components may be controlled via the operator controls. The flight control components may be controlled to adjust the pitch of the aircraft 10.

Figure 2:
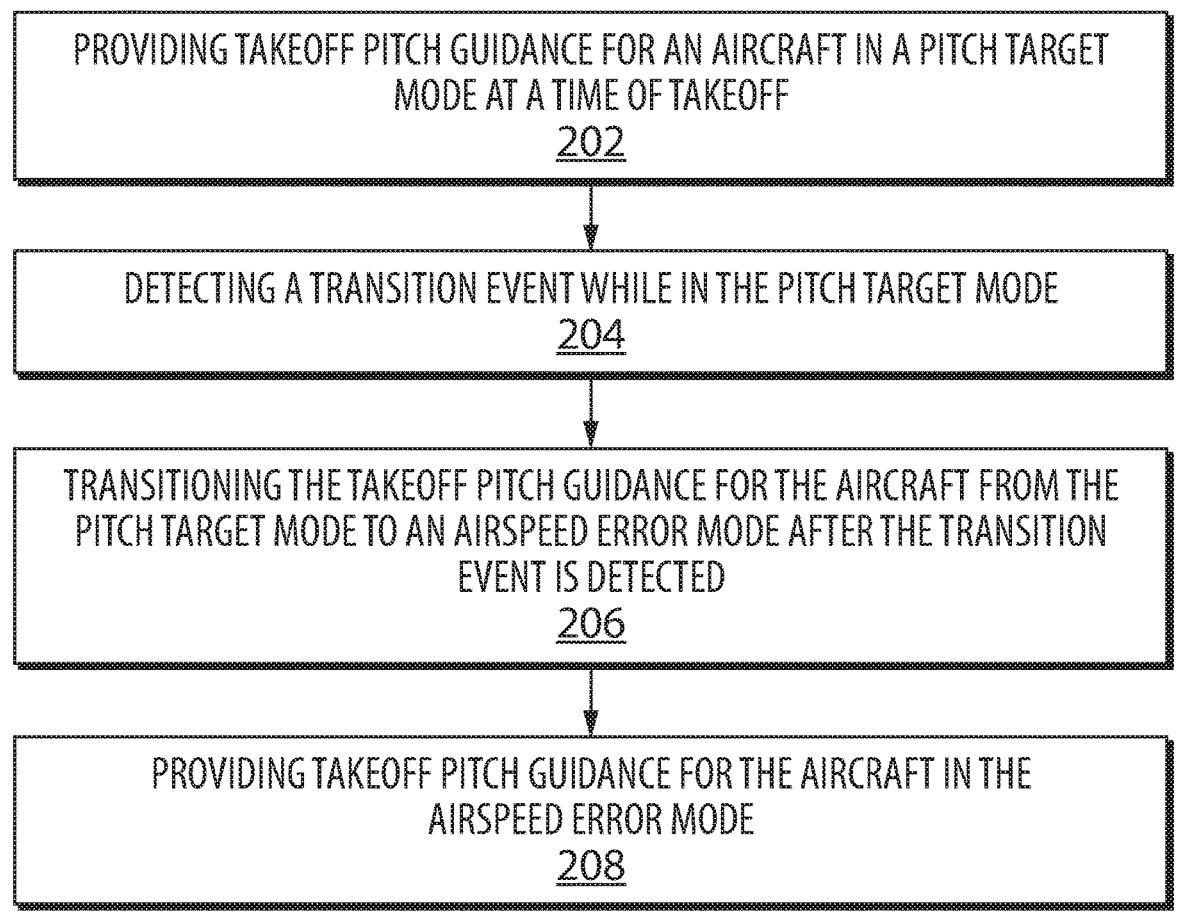
FIG. 2 is a flowchart of a method for providing takeoff pitch guidance for an aircraft in accordance with an embodiment.

With reference to FIG. 2, there is illustrated a flowchart of an example method 200 for providing takeoff pitch guidance for an aircraft, such as the aircraft 10 of FIG. 1. While the method 200 is described herein with reference to the aircraft 10, the method 200 may be applied to other types of aircraft. Note that pitch guidance should be understood to include pitch and/or pitch rate.

At step 202, takeoff pitch guidance for the aircraft 10 is provided in a pitch target mode at a time of takeoff. The pitch target mode corresponds to determining a target pitch as a function of aircraft operating parameters. The aircraft 10 may be monitored to determine the aircraft operating parameters such that aircraft operating parameters may then be used in determining the target pitch.

The aircraft operating parameters may comprise one or more of a flap configuration of the aircraft 10, acceleration capabilities of the aircraft 10, and engine operability of the aircraft 10. Flap configuration refers to a configuration of one or more of the flight control components 16. Accordingly, the aircraft operating parameters may depend on the configuration of one or more of the flight control components 16. In accordance with an embodiment, flap configuration refers to the configuration of the slats and/or flaps of the aircraft 10, which may change throughout the flight. Acceleration capabilities refer, for example, to a difference between a takeoff safety speed ($V_2$) of the aircraft 10 and a rotational speed ($V_R$) of the aircraft 10. $V_2$ refers to the minimum speed at which the aircraft may safely climb in the event that one engine fails. $V_R$ refers to the speed at which control inputs begin to be applied to cause a nose of the aircraft 10 to pitch up, after which it would leave the ground. Engine operability refers to whether all of the engines 20 are operative or whether one of the engines 20 is inoperative.

When all of the engines 20 are operative this may be referred to as all engines operative (AEO) and when one of the engines 20 is inoperative this may be referred to as one engine inoperative (OEI). Accordingly, the aircraft operating parameters may depend on if the aircraft 10 is AEO or OEI.

In some embodiments, the target pitch is determined based on tabulated data corresponding to the aircraft operating parameters.

At step 204, a transition event is detected while in the pitch target mode. In some embodiments, the transition event corresponds to when a weight-off-wheels condition of the aircraft 10 is met. The transition event may be detected by monitoring liftoff of the aircraft 10, as will be explained in more detail below.

At step 206, the takeoff pitch guidance for the aircraft 10 is transitioned from the pitch target mode to an airspeed error mode after the transition event is detected. The airspeed error mode corresponds to determining the target pitch based on a difference between an actual speed and a target speed of the aircraft 10. The actual air speed of the aircraft 10 may be determined by monitoring the airspeed of the aircraft 10. Airspeed refers to the speed of the aircraft 10 relative to the air. The target speed may correspond to a desired airspeed of the aircraft 10 during takeoff. In the case that the actual speed of the aircraft 10 is above the target speed, then the aircraft 10 would typically need to be decelerated. Similarly, in the case that the actual speed of the aircraft 10 is below the target speed, then the aircraft 10 would typically need to be accelerated. As such, by determining target pitch based on the difference between the actual speed and the target speed of the aircraft 10, the speed of the aircraft 10 may be controlled. At step 208, takeoff pitch guidance for the aircraft is provided in the airspeed error mode.

Figure 3:
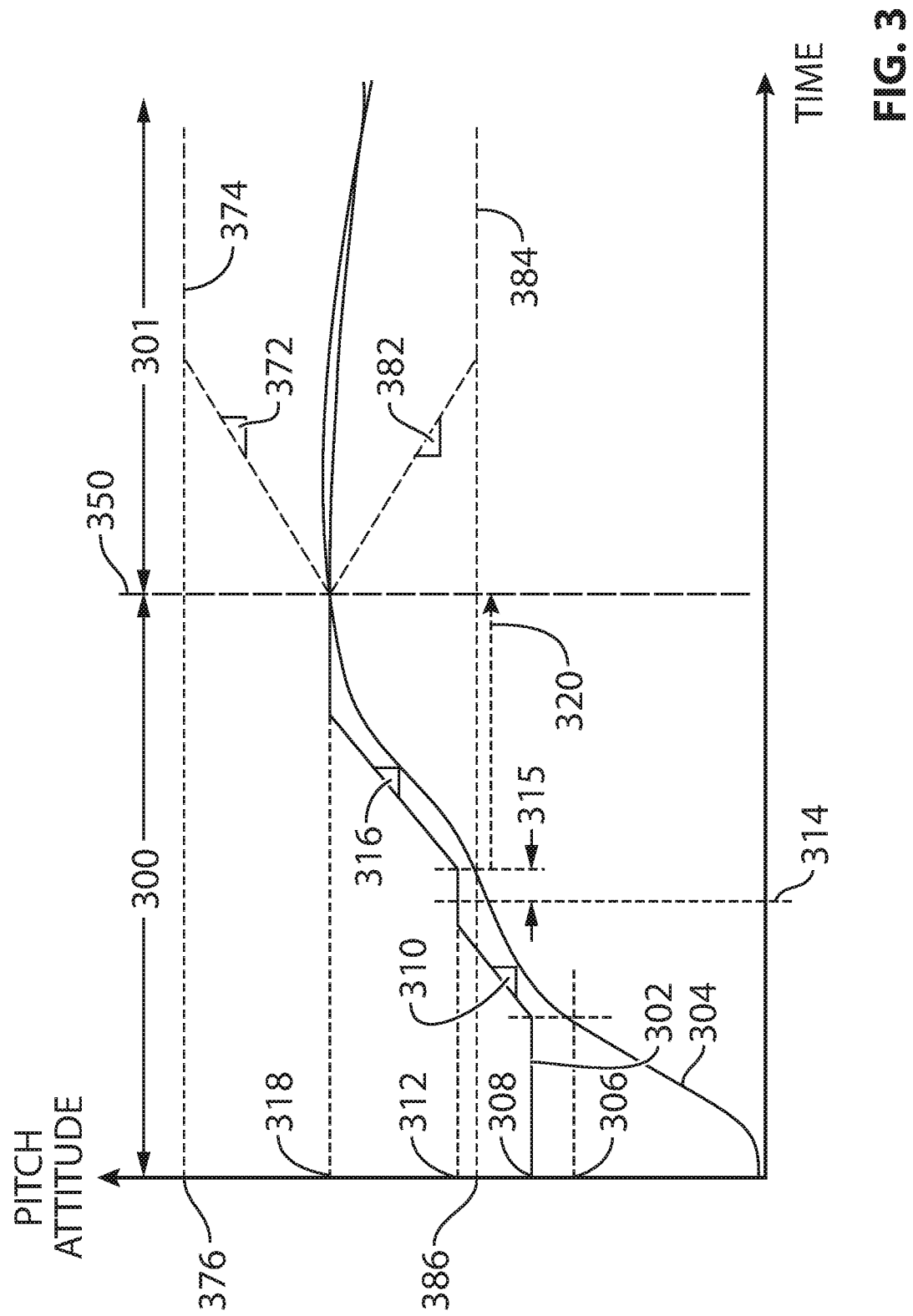
FIG. 3 is an example graphical representation illustrating takeoff pitch guidance in accordance with an embodiment.

With reference to FIG. 3, a graphical representation illustrates takeoff pitch guidance. It should be appreciated that FIG. 3 illustrates a specific and non-limiting implementation of method 200. The implementation of method 200 may vary depending on practical implementations.

The graph of FIG. 3 illustrates pitch attitude over time while the takeoff pitch guidance is operated in a pitch target mode 300 and while the takeoff pitch guidance is operated in an airspeed error mode 301. Marker 350 illustrates the transition from the pitch target mode 300 to the airspeed error mode 301. Throughout the course of the takeoff manoeuvre, curve 302 represents a target pitch while curve 304 represents an actual or current pitch of the aircraft.

While in the pitch target mode 300, target pitch is determined using aircraft operating parameters. In some embodiments, more than one target pitch is set over time when the aircraft 10 is operating in pitch target mode 300. For example, and as illustrated in FIG. 3, three different target pitches are used, namely an initial target pitch 308, an intermediate target pitch 312, and a final target pitch 318. The target pitch 302 is maintained constant at each one of the target pitches for a given amount of time and then the target pitch 302 is changed to another target pitch. In some embodiments, the initial, intermediate, and final target pitches are all displayed to the pilot at the appropriate time. Alternatively, not all of the target pitches are displayed. For example, the intermediate target pitch 312 may be provided as a safety feature that is not displayed.

More or less than three target pitches may be used. For example, the increase from initial target pitch 308 to final target pitch 318 may comprise more than a single intermediary step, or no intermediary step. Each intermediary step may be incremental so as to slowly transition from the initial target pitch 308 to the final target pitch 318. Alternatively, larger steps may be used, thus reducing the overall number of pitch levels to be reached. In some embodiments, only a final target pitch 318 is provided, without an initial target pitch 308 or an intermediate target pitch 312.

In some embodiments, a trigger to change the target pitch 302, for example from the initial target pitch 308 to the intermediate target pitch 312, is the current pitch 304 of the aircraft 10. For example, when the current pitch 304 reaches an initial pitch trigger value 306, the initial target pitch 308 may be changed to the intermediate target pitch 312. In some embodiments, other trigger factors may cause the transition from one target pitch value to another target pitch value, such as when the weight-off-wheels condition of the aircraft is met. For example, the intermediate target pitch 312 may be changed to the final target pitch 318 when the weight-off-wheels condition of the aircraft is met.

In some embodiments, one or more of the target pitches 308, 312, 318 is set as a function of a desired or target rate of change of pitch over time, also referred to as pitch rate. For example, the intermediate target pitch 312 may be set as a function of a first rate of change 310 of pitch over time. Similarly, for example, the final target pitch 318 may be set as a function of a second rate of change 316 of pitch over time.

In some embodiments, one or more of the target pitches 308, 312, 318 is set as a function of aircraft operating parameters. For example, one or more of the target pitches 308, 312, 318 may be set based on one or more of flap configuration, acceleration capabilities, and engine operability. By way of a specific and non-limiting example, the initial target pitch 308 may be set based on engine operability, the intermediate target pitch 312 may be set based on engine operability and the final target pitch may be set based on flap configuration, acceleration capabilities, and engine operability.

In some embodiments, one or more of the pitch rates 310, 316 is set as a function of aircraft operating parameters. For example, one or more of the pitch rates 310, 316 may be set based on engine operability.

In some embodiments, at least one of the target pitches 308, 312, 318 is set to a value where the tail of the aircraft 10 has cleared a ground striking point. For example, the intermediate target pitch 312 may correspond to a value where the tail of the aircraft 10 has cleared a ground striking point. The value where the tail of the aircraft 10 has cleared a ground striking point may be independent of the aircraft operating parameters.

The takeoff pitch guidance is configured to transition from the pitch target mode 300 to the airspeed error mode 301 upon detection of a transition event. In some embodiments, the transition event corresponds to when a weight-off-wheels condition of the aircraft is met. This is illustrated, for example, at marker 314 in FIG. 3. In some embodiments, a first time delay 315 is used to confirm the weight-off-wheels condition. In some embodiments, a second time delay 320 is also added before the transition 350 occurs. The first and second time delays 315, 320 may both be used or alternatively, only one of the time delays 315, 320 is applied before the transition 350. In some embodiments, no time delays are provided and the transition 350 occurs as soon as the transition event is detected.

The first time delay 315 may be any suitable time to confirm that the aircraft 10 is off-ground. The first time delay 315 may be selected to mitigate the effect of hesitation of the aircraft 10 at liftoff in low thrust to weight conditions, to mitigate the effect of short duration spikes falsely representing that the aircraft 10 is off-ground, and/or to augment the level of tail-strike mitigation by delaying the increasing of the pitch attitude limit and/or rate limit until a specified time following detection of the aircraft 10 being off ground. By way of a specific and non-limiting example, the first time delay 315 may be set to 0.3 s, 0.5 s, or 0.8 seconds. Other values are also contemplated.

The second time delay 320 may corresponds to a time from confirmation of the weight-off-wheels condition until the aircraft 10 is expected to have reached the final target pitch 318. The second time delay 320 may be set based on the aircraft operating parameters. In some embodiments, the second time delay 320 is set based on the flap configuration, acceleration capabilities, and engine operability. The second time delay 320 may be determined from simulation. For example, a simulation may be done to determine expected times that it would take the aircraft 10 to reach the final target pitch 318 after the weight-off-wheels condition is met for various aircraft operating parameters. Accordingly, the second time delay 320 may be selected depending on the aircraft operating parameters at the time the weight-off-wheels condition is met.

At the transition 350, takeoff pitch guidance transitions from the pitch target mode 300 to the airspeed error mode 301. While in the airspeed error mode 301, the target pitch is determined based on a difference between an actual speed and a target speed of the aircraft 10. In some embodiments, the airspeed error mode 301 comprises determining target pitch for the aircraft 10 based on a takeoff airspeed control law. The takeoff airspeed control law may comprise a formula, a mathematical function, a lookup table and/or any other suitable technique that could be used to determine a target pitch from the difference between the actual speed and the target speed of the aircraft 10.

While in the airspeed error mode 301, a minimum pitch limit 384 and/or a maximum pitch limit 374 may be provided to ensure that the target pitch, although determined as a function of an airspeed error, does not exceed an upper and/or lower bound. The maximum pitch limit 274 may be used for pilot space disorientation reasons, while the minimum pitch limit 384 may be used to protect a minimum climb gradient. In some embodiments, maximum and/or minimum pitch limits 384, 374 are also used during the pitch target mode 300. The pitch limits 384, 374 may be set to constant values that are maintained throughout the airspeed error mode 301. Alternatively, the pitch limits 384, 374 may increase for a first time period and then remain constant when a given value is reached, as illustrated in FIG. 3. Other scenarios for the pitch limits are also contemplated.

The minimum pitch limit 384 and/or the maximum pitch limit 374 may be set as a function of aircraft operating parameters. For example, one or more of the pitch limits 374, 384 may be set based on engine operability, or engine operating status. The pitch of the aircraft 10 may be able to change at a higher rate when OEI, compared to when AEI.

The minimum pitch limit 384 and/or a maximum pitch limit 374 may also be set as a function of a desired or target pitch rate 372, 382. In some embodiments, one or more of the pitch rates 372, 382 is set as a function of aircraft operating parameters. For example, the pitch rates 372, 382 may be set to a higher rate of change when OEI, compared to when AEI.

In the embodiment illustrated in FIG. 3, the maximum pitch limit 374 and the minimum pitch limit 384 are initially set to the final target pitch 318 at the time of the transition 350. Then, the maximum pitch limit 374 is set as a function of a maximum pitch rate 372 until reaching a final maximum pitch limit value 376 and the minimum pitch limit 384 is set a minimum pitch rate 382 until reaching a final minimum pitch limit value 386.

As noted above, in the pitch target mode 300, target pitch is determined as a function of aircraft operating parameters. For example, one or more of the target pitches 308, 312, 318, the pitch rates 310, 316, the trigger value 306 and the second time delay 320 is set based on aircraft operating parameters. In some embodiments, the values for one or more of the target pitches 308, 312, 318, the pitch rates 310, 316, the trigger value 306 and the second time delay 320 are different for an aircraft operating AEO vs an aircraft operating OEI. Accordingly, the engine operability may be monitored to determine if the aircraft 10 is AEO or OEI and one or more of the target pitches 308, 312, 318, the pitch rates 310, 316, the trigger value 306 and the second time delay 320 may be set depending on whether the aircraft is AEO or OEI.

As noted above, while in the airspeed error mode 301, one or more of the minimum pitch limit 384, the maximum pitch limit 374 and the pitch rates 372, 382 is set as a function of aircraft operating parameters. In some embodiments, the values for one or more of the minimum pitch limit 384, the maximum pitch limit 374 and the pitch rates 372, 382 are different for an aircraft operating AEO vs an aircraft operating OEI. Accordingly, the engine operability may be monitored to determine if the aircraft 10 is AEO or OEI and one or more of the minimum pitch limit 384, the maximum pitch limit 374 and the pitch rates 372, 382 may be set depending on whether the aircraft is AEO or OEI.

In other examples, the minimum pitch rate 382 and the maximum pitch rate 372 may be based on engine operability, flap configuration and/or acceleration capabilities. Accordingly, the engine operability, flap configuration and/or acceleration capabilities may be monitored and the minimum pitch rate 382 and the maximum pitch rate 372 may be set depending on the engine operability, flap configuration and/or acceleration capabilities.

One or more of the target pitches 308, 312, 318, the pitch rates 310, 316, trigger value 306, the second time delay 320, the minimum pitch limit 384, the maximum pitch limit 374 and the pitch rates 372, 382 may be determined by computer simulation, modeling and/or processing. The computer simulation, modeling and/or processing may be done in real-time during takeoff or may be pre-determined in advance to takeoff. In some embodiments, setting one or more of the target pitches 308, 312, 318, the pitch rates 310, 316, trigger value 306, the second time delay 320, the minimum pitch limit 384, the maximum pitch limit 374 and the pitch rates 372, 382 may comprise selecting a pre-determined value based on aircraft operating parameters, for example from a look-up table.

In accordance with some embodiments, a longitudinal acceleration may be applied to the target speed in the airspeed error mode 301. For example, the longitudinal acceleration may be used to predict if the aircraft 10 will overshoot an initial target speed. In the case of predicting overshoot, the target speed may be increased. This may prevent the aircraft 10 from excessive pitch up during takeoff.

In accordance with some embodiments, the target pitch is damped using complemented longitudinal acceleration. For example, when providing pitch guidance in the airspeed error mode, and specifically using an airspeed control law, pitch guidance is adjusted based on the error between the aircraft speed and the takeoff reference speed. In order to provide a smooth pitch guidance, the actual values may be damped using aircraft acceleration.

In some embodiments, providing pitch guidance according to method 200 may comprise dynamically changing the target pitch in response to detecting failure of one of the engines 20. For example, when the aircraft's engines change from being AEO to OEI, any of the parameters for determining the target pitch (e.g., the initial target pitch 308, first rate of change 310, the second rate of change 316, the initial pitch trigger value 306, the final target pitch 318, the time delay 320, the minimum pitch rate 382 and the maximum pitch rate 372, the final minimum pitch limit 386 and/or the final maximum pitch limit 376) may change from a value for when AEO to a value for when OEI.

In some embodiments, the method 200 may be reset if the pitch of the aircraft 10 falls below a reset value. For example, the reset value may be 3 degrees, 4 degrees, 5 degrees, and any other suitable value.

Figure 4:
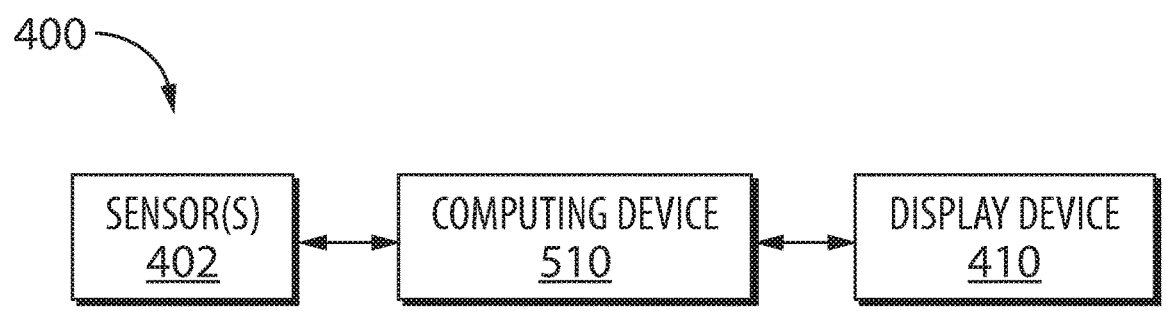
FIG. 4 is a block diagram of an example guidance system.

With reference to FIG. 4, the method 200 may be implemented by a guidance system 400 comprising a computing device 510. In some embodiments, one or more sensors 402 and/or one or more display device 410 are also provided, as will be explained in more detail below.

Figure 5:
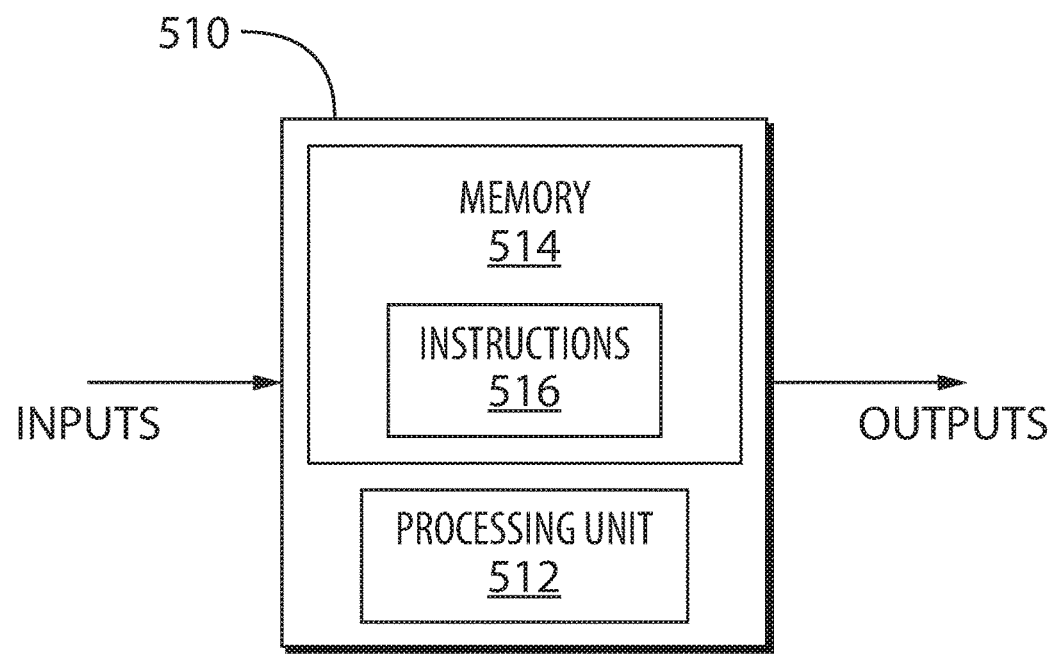
FIG. 5 is a block diagram of an example computing device.

With additional reference to FIG. 5, the computing device 510 comprises a processing unit 512 and a memory 514 which has stored therein computer-executable instructions 516. The processing unit 512 may comprise any suitable devices configured to implement the method 200 such that instructions 516, when executed by the computing device 510 or other programmable apparatus, may cause the functions/acts/steps performed as part of the method 200 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

The methods and systems for providing takeoff pitch guidance described herein may be implemented in a high level procedural or object oriented programming or scripting language, or a combination thereof, to communicate with or assist in the operation of a computer system, for example the computing device 510. Alternatively, the methods and systems for providing takeoff pitch guidance may be implemented in assembly or machine language. The language may be a compiled or interpreted language. Program code for implementing the methods and systems for providing takeoff pitch guidance may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for providing takeoff pitch guidance may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and predefined manner to perform the functions described herein, for example those described in the method 200. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Referring back to FIG. 4, the one or more sensors 402 may comprise an airspeed sensor operatively coupled to computing device 510 for receiving the computed airspeed for the aircraft 10. The one or more sensors 402 may comprise a pitch sensor operatively coupled to computing device 510 for receiving the pitch of the aircraft 10. The one or more sensors 402 may comprise a pitch rate sensor operatively coupled to computing device 510 for receiving the pitch rate for the aircraft 10. The one or more sensors 402 may comprise an engine failure sensor operatively coupled to computing device 510 for receiving the engine failure status for the aircraft 10. The engine failure status of the aircraft 10 is whether one or more of the aircraft's engines have failed and may include determining if the aircraft's engines are AEO or OEI. The one or more sensors 402 may comprise an altitude sensor operatively coupled to computing device 510 for receiving the altitude of the aircraft 10. The altitude of the aircraft 10 is the elevation of the aircraft 10 above a terrain. The altitude of the aircraft 10 may be determined utilizing a radio altimeter. The one or more sensors 402 may comprise any other type of suitable sensor(s). For example, the one or more sensors 402 may comprise a lateral acceleration sensor, a yaw rate sensor and/or a roll angle sensor a roll rate sensor. The one or more sensors 402 may be used to detect liftoff of the aircraft 10. Alternatively, the one or more sensors 402 may comprise a sensor for detecting liftoff of the aircraft 10. In some embodiments, the sensors 402 are separate from the pitch guidance system 400 and/or may be existing parts of the aircraft 10. The sensors 402 may be used for the purposes of implementing the method 200. In some embodiments, data described herein as coming from the sensors 402 are provided by one or more other aircraft computing device.

The display device 410 may comprise any kind of display such as an LCD (liquid crystal display), an LED (light emitting diode) display, a CRT (cathode ray tube) display, a HUD (Heads-up Display), a PFD (primary flight display) and/or any other suitable display device. A HUD is any transparent display that presents data in the pilot or co-pilot's field of vision without obstructing the view. A PFD is an aircraft instrument dedicated to flight information. The display device 410 may display the target pitch as calculated by the computing device 510. Accordingly, the computing device 510 may cause a GUI (graphical user interface) to display the target pitch on the display device 410. The display device 410 may be used for the purpose of displaying one or more guidance cues generated during the method 200. For example, providing pitch guidance according to method 200 may comprise causing the display device 410 to display pitch guidance cues representative of the target pitch. In some embodiments, the display device 410 is separate from the pitch guidance system 400 and/or may be an existing part of the aircraft 10.

Figure 6A:
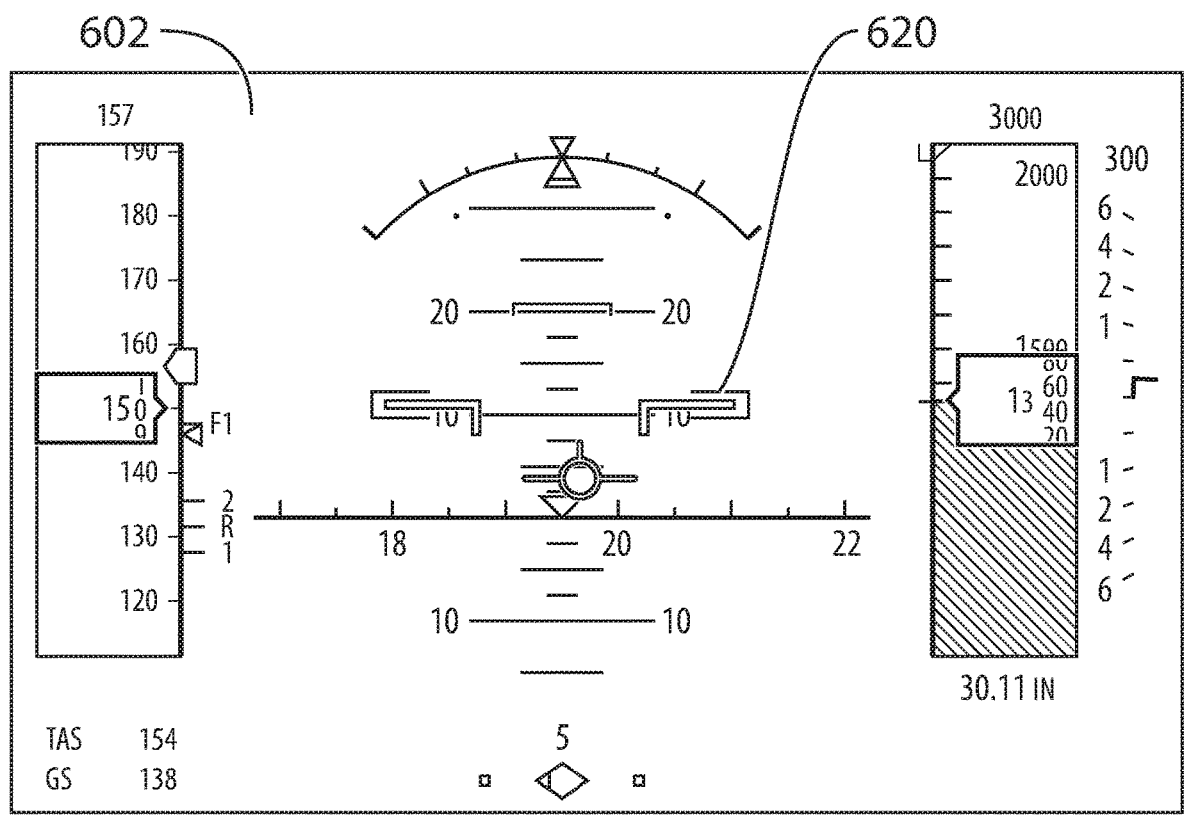
FIGS. 6A to 6C are examples of a primary flight display illustrating guidance cues for takeoff pitch guidance.
Figure 6B:
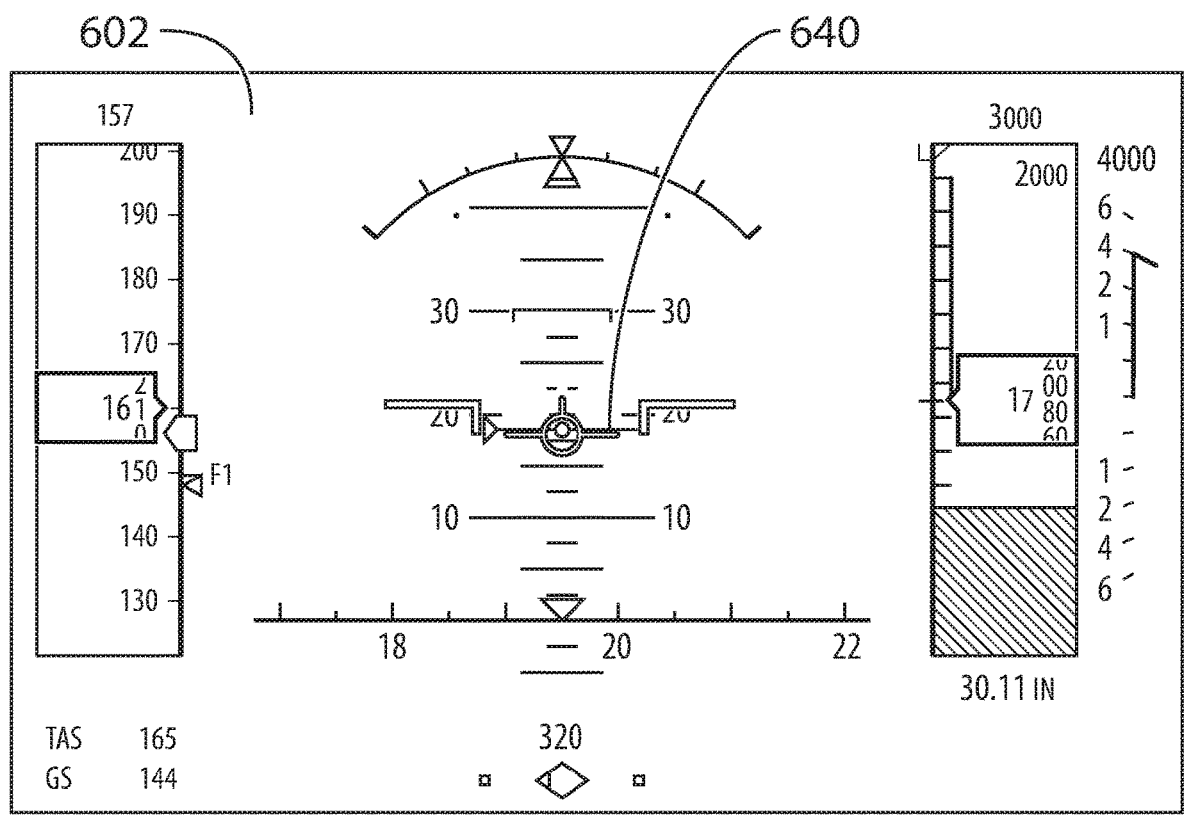
Figure 6C:
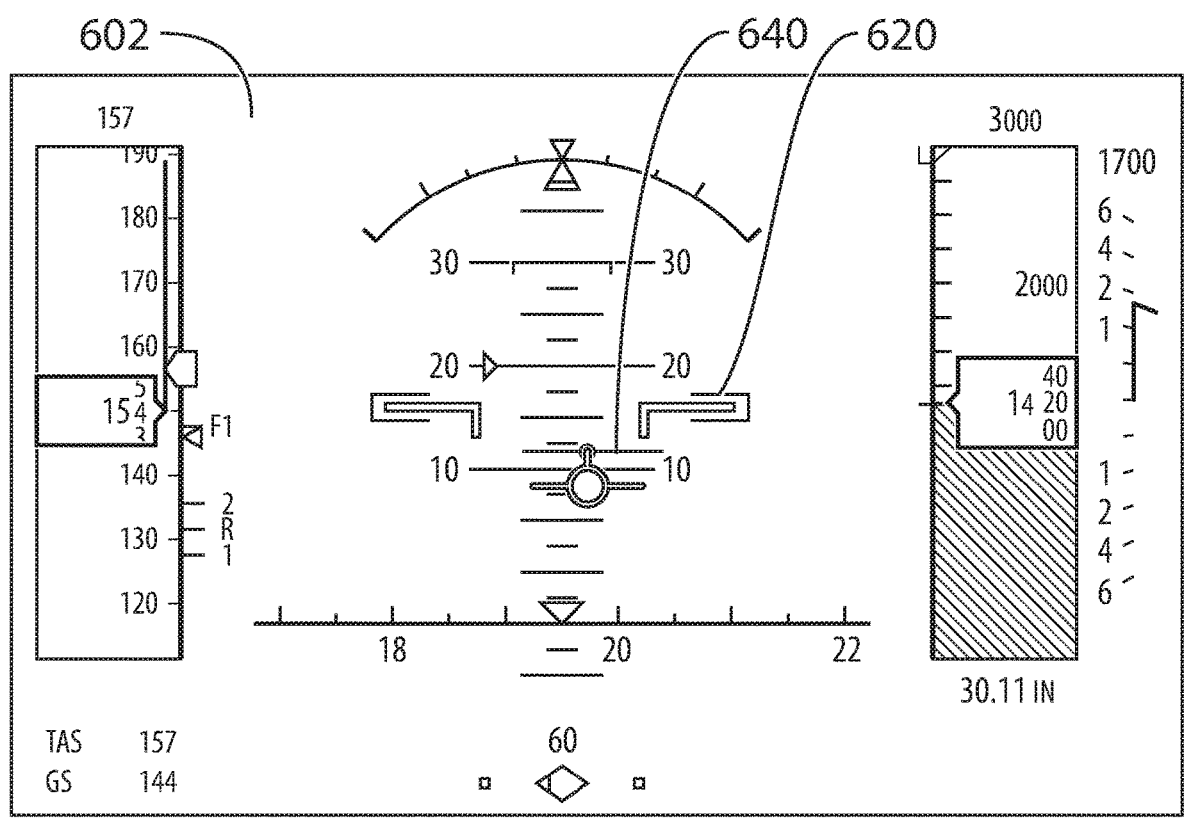

With reference to FIGS. 6A to 6C, one or more guidance cues are displayed on a primary flight display 602. As shown in FIG. 6A, an example guidance cue in the form of a pitch target marker 620 is displayed. The pitch target marker 620 may be displayed during the pitch target mode 300. In accordance with an embodiment, the pitch target marker 620 displays the target pitch while in the pitch target mode 300. When in pitch target mode 300, the position of the pitch target marker 620 is set as a function of the target pitch determined using aircraft operating parameters, as described herein.

FIG. 6B illustrates a flight director 640 displayed on the flight display 602. In some embodiments, the flight director 640 displays the target pitch while in the airspeed error mode 301. As illustrated, the pitch target marker 620 and the flight director 640 do not necessarily show the same target. In some embodiments, the flight director 640 is provided in terms of flight path as a gamma target.

FIG. 6C illustrates an embodiment where both the pitch target marker 620 and the flight director 640 are displayed. This may occur, for example, during a transition period from the pitch target mode 300 to the airspeed error mode 301. In some embodiments, the flight director 640 is added to the flight display 602 after the transition event is detected, for example when the weight-off-wheels condition is detected (at marker 314), after the first time period 315, or after the second time period 320. The pitch target marker 620 may remain on the flight display 602 throughout the airspeed error mode 301, or be removed. In some embodiments, the pitch target marker 620 is removed as soon as pitch guidance is no longer provided in the pitch target mode or in takeoff mode. Alternatively, the pitch target marker 620 is initially maintained on the flight display 602 when operating in the airspeed error mode 301 and is eventually removed, for example after 5 seconds, 7 seconds, 9 seconds, or any other suitable duration of time. In some embodiments, the pitch target marker 620 is removed from the flight display 602 when the aircraft reaches a specific height, such as 200 feet, 250 feet, 300 feet, or any other suitable height. The specific height may be determined based on the pressure and/or altitude at liftoff, or may be predetermined using other aircraft parameters.

As illustrated, pitch target marker 620 is shown as a pair of brackets and the flight director 640 is illustrated as a line with a circle. However, each guidance cue (e.g., the pitch target marker 620 and/or the flight director 640) may be represented by a pair of brackets, a line, a point, a shape, text, letters, and/or any other visual symbol.

The target pitch may be filtered prior to being displayed on the displace device 410. For example, a first order filter may be applied to a signal sent to the display device 410 for displaying the target pitch. A filter time constant may be tunable. The filtering may be done to provide a smooth transition in display at the transition point 350 from the pitch target mode 300 to airspeed error mode 301.

Computer simulation, modeling, engineering simulators and/or processing may be used to determine the initial target pitch 308, the first rate of change 310, the intermediate target pitch 312, the second rate of change 316, the initial pitch trigger value 306, the final target pitch 318, the time delay 320, the minimum pitch rate 382 and the maximum pitch rate 372, the final minimum pitch limit 386, the final maximum pitch limit 376 and/or any other parameters described in this document. The computer simulation, modeling and/or processing may be done in real-time during takeoff, may be pre-determined in advance to takeoff, and/or may be determined at regular intervals.

The values provided in Tables 1 to 7 are provided for example purposes only. In some embodiments, interpolation may be used to determine values between ranges in the tables. In some embodiments, a formula, a mathematical function, a lookup table and/or any other suitable technique may be used to determine the initial target pitch 308, the first rate of change 310, the intermediate target pitch 312, the second rate of change 316, the initial pitch trigger value 306, the final target pitch 318, the time delay 320, the minimum pitch rate 382 and the maximum pitch rate 372, the final minimum pitch limit 386, the final maximum pitch limit 376 and/or any other parameters described in this document.

In some embodiments, providing pitch guidance according to method 200 comprises displaying the target pitch to the pilot of the aircraft 10 via a display inside the cockpit. The pilot may then make appropriate adjustments to the pitch of the aircraft 10 by use of the operator controls in order to command the pitch of the aircraft 10 on the basis of the pitch guidance. For example, the pilot may view the target pitch displayed on the display device 410 and adjust operator controls to the target pitch.

In some embodiments, providing pitch guidance according to method 200 comprises providing the target pitch to an autopilot program implemented on a computing device, such as the computing device 510. Accordingly, the autopilot program may make appropriate adjustments to the pitch of the aircraft 10 in order to command the pitch of the aircraft 10 on the basis of the pitch guidance. In this situation, the target pitch may or may not be displayed. In some embodiments, the actual pitch of the aircraft 10 is displayed, either instead of or in addition to the target pitch.

In some embodiments, the methods and systems for providing pitch guidance described herein may be used for go-around maneuvers. Go-around maneuvers refer to aborting landing of the aircraft 10 when on a landing approach.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for providing takeoff pitch guidance may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for providing takeoff pitch guidance for an aircraft, the method comprising:
   providing takeoff pitch guidance for the aircraft in a pitch target mode at a time of takeoff, the pitch target mode corresponding to determining a target pitch as a function of aircraft operating parameters;
   detecting a transition event while in the pitch target mode, wherein the transition event corresponds to when a weight-off-wheels condition of the aircraft is met,
   transitioning the takeoff pitch guidance for the aircraft from the pitch target mode to an airspeed error mode after the transition event is detected and after a time delay that starts when the weight-off-wheels condition is met, the airspeed error mode corresponding to determining the target pitch based on a difference between an actual speed and a target speed of the aircraft; and
   providing the takeoff pitch guidance in the airspeed error mode,
   wherein the method further comprises providing a minimum pitch limit and a maximum pitch limit when in the airspeed error mode.

2. The method of claim 1, further comprising determining the time delay based on the aircraft operating parameters.

3. The method of claim 1, wherein determining the target pitch comprises setting the target pitch to an initial target pitch, monitoring a current pitch of the aircraft, and changing the initial target pitch as a function of the current pitch of the aircraft to reach a final target pitch.

4. The method of claim 3, wherein changing the initial target pitch comprises setting the target pitch to an intermediate target pitch, and changing the intermediate target pitch to the final target pitch.

5. The method of claim 4, wherein the intermediate target pitch is set as a function of a first rate of change of pitch over time, and the final target pitch is set as a function of a second rate of change of pitch over time.

6. The method of claim 4, wherein the intermediate target pitch corresponds to a value where a tail of the aircraft has cleared a ground striking point.

7. The method of any one of claim 4, wherein changing the intermediate target pitch comprises setting the target pitch to the final target pitch when the transition event occurs.

8. The method of claim 1, wherein the airspeed error mode comprises determining the target pitch of the aircraft based on a takeoff airspeed control law.

9. The method of claim 1, wherein providing pitch guidance comprises displaying a pitch target marker on an aircraft display when in the pitch target mode and displaying a flight director on the aircraft display when in the airspeed error mode.

10. A system for providing takeoff pitch guidance for an aircraft, the system comprising:
    a processing unit; and
    a non-transitory computer-readable memory having stored thereon program instructions executable by the processing unit for:
       providing takeoff pitch guidance for the aircraft in a pitch target mode at a time of takeoff, the pitch target mode corresponding to determining a target pitch as a function of aircraft operating parameters;
       detecting a transition event while in the pitch target mode, wherein the transition event corresponds to when a weight-off-wheels condition of the aircraft is met,
       transitioning the takeoff pitch guidance for the aircraft from the pitch target mode to an airspeed error mode after the transition event is detected and after a time delay that starts when the weight-off-wheels condition is met, the airspeed error mode corresponding to determining the target pitch based on a difference between an actual speed and a target speed of the aircraft; and
       providing the takeoff pitch guidance in the airspeed error mode,
       wherein the program instructions are further executable by the processing unit for providing a minimum pitch limit and a maximum pitch limit when in the airspeed error mode.

11. The system of claim 10, wherein the program instructions are further executable by the processing unit for determining the time delay based on the aircraft operating parameters.

12. The system of claim 10, wherein determining the target pitch comprises setting the target pitch to an initial target pitch, monitoring a current pitch of the aircraft, and changing the initial target pitch as a function of the current pitch of the aircraft to reach a final target pitch.

13. The system of claim 12, wherein changing the initial target pitch comprises setting the target pitch to an intermediate target pitch, and changing the intermediate target pitch to the final target pitch.

14. The system of claim 13, wherein the intermediate target pitch is set as a function of a first rate of change of pitch over time, and the final target pitch is set as a function of a second rate of change of pitch overtime.

15. The system of claim 13, wherein the intermediate target pitch corresponds to a value where a tail of the aircraft has cleared a ground striking point.

16. The system of claim 13, wherein changing the intermediate target pitch comprises setting the target pitch to the final target pitch when the transition event occurs.

17. The system of claim 10, wherein the airspeed error mode comprises determining the target pitch of the aircraft based on a takeoff airspeed control law.

18. The system of claim 10, wherein providing pitch guidance comprises displaying a pitch target marker on an aircraft display when in the pitch target mode and displaying a flight director on the aircraft display when in the airspeed error mode.

* * * * *